United States Patent
Allen (10) Patent No.: US 10,094,406 B2
(45) Date of Patent: Oct. 9, 2018

(54) INSERT CONNECTOR AND STEM CASTER ASSEMBLY USING THE SAME

(71) Applicant: PRAIRIE VIEW INDUSTRIES, INC., Fairbury, NE (US)

(72) Inventor: Richard D. Allen, Fairbury, NE (US)

(73) Assignee: PRAIRIE VIEW INDUSTRIES, INC., Fairbury, NE (US)

( * ) Notice: Subject to any disclaimer, the term of this patent is extended or adjusted under 35 U.S.C. 154(b) by 574 days.

(21) Appl. No.: 14/563,419

(22) Filed: Dec. 8, 2014

(65) Prior Publication Data
US 2016/0160897 A1    Jun. 9, 2016

(51) Int. Cl.
   F16D 1/08    (2006.01)
   F16B 7/04    (2006.01)
   B60B 33/00   (2006.01)
   F16B 35/00   (2006.01)

(52) U.S. Cl.
   CPC .......... F16B 7/0413 (2013.01); B60B 33/0002 (2013.01); F16B 35/005 (2013.01); Y10T 403/7041 (2015.01)

(58) Field of Classification Search
   CPC .......... F16B 2/04; F16B 7/0413; F16B 35/005; F16B 2012/403; Y10T 403/557; Y10T 403/7041; B60B 33/0002
   See application file for complete search history.

(56) References Cited

U.S. PATENT DOCUMENTS

| | | | | |
|---|---|---|---|---|
| 1,678,350 A | * | 7/1928 | Ott | F16B 7/0413 256/65.15 |
| 1,707,363 A | * | 4/1929 | Opremchak | A47B 91/02 16/19 |
| 2,657,944 A | | 11/1953 | Miller | |
| 3,079,185 A | * | 2/1963 | Foster | E05B 65/1066 403/366 |
| 3,507,508 A | * | 4/1970 | Andrews | B23B 31/1075 279/83 |
| 3,651,653 A | * | 3/1972 | Mouton, Jr. | E02D 5/523 403/297 |
| 3,731,562 A | * | 5/1973 | Heuser | B23B 29/03485 408/150 |
| 3,753,583 A | * | 8/1973 | Offenbroich | A47B 47/0008 403/290 |

(Continued)

*Primary Examiner* — Josh Skroupa
*Assistant Examiner* — Matthew R McMahon
(74) *Attorney, Agent, or Firm* — Stinson Leonard Street LLP (57) ABSTRACT

A connector for removably securing a first member having a hollow cavity with a second member such that a portion of the second member is removably fixed within the hollow cavity of the first member. The connector is configured to be inserted into the hollow cavity and has an outer bearing surface configured to rest in abutting engagement with the corresponding portion of the inner wall of the cavity when the connector is inserted into the cavity. The connector also includes an inner bearing surface that corresponds with a portion of an outer wall or surface of a second member and is additionally configured to accommodate the use of a force applicator to press the second member against the inner bearing surface and to press the outer bearing surface against the first member's inner wall to removably fix the second member and connector within the cavity.

11 Claims, 7 Drawing Sheets

(56) References Cited

U.S. PATENT DOCUMENTS

| | | | | |
|---|---|---|---|---|
| 3,754,767 A | * | 8/1973 | Bennett | B23B 29/20 |
| | | | | 279/14 |
| 3,977,800 A | * | 8/1976 | Cassel | F16B 7/0446 |
| | | | | 403/172 |
| 4,094,330 A | * | 6/1978 | Jong | A61H 3/00 |
| | | | | 135/67 |
| 4,104,000 A | * | 8/1978 | Fleischmann | E04F 11/1812 |
| | | | | 256/65.14 |
| 4,185,938 A | * | 1/1980 | Pareja | F16D 1/02 |
| | | | | 403/359.5 |
| 4,249,830 A | | 2/1981 | Day | |
| 4,435,103 A | * | 3/1984 | Becker | A47B 13/02 |
| | | | | 248/188 |
| 4,549,832 A | * | 10/1985 | Sterl | F16B 7/0473 |
| | | | | 16/277 |
| 4,671,478 A | * | 6/1987 | Schoenig | F16B 7/0413 |
| | | | | 16/19 |
| 4,756,639 A | * | 7/1988 | Hoshino | F16B 5/0088 |
| | | | | 403/183 |
| 4,818,135 A | * | 4/1989 | Desjardins | F16B 7/1472 |
| | | | | 248/413 |
| 4,859,109 A | * | 8/1989 | Targetti | F16B 7/0413 |
| | | | | 403/297 |
| 4,896,892 A | * | 1/1990 | Andrews | B23B 31/1075 |
| | | | | 279/145 |
| 4,958,966 A | * | 9/1990 | Andrews | B23B 31/1075 |
| | | | | 279/143 |
| 5,080,536 A | * | 1/1992 | Andrews | B23B 29/04 |
| | | | | 279/145 |
| 5,083,882 A | | 1/1992 | Liu | |
| 5,605,410 A | * | 2/1997 | Pantev | F16B 7/0486 |
| | | | | 403/174 |
| 6,722,810 B1 | * | 4/2004 | Tachikawa | F16B 7/0413 |
| | | | | 403/109.1 |
| 6,874,971 B2 | * | 4/2005 | Albaugh | F16B 2/04 |
| | | | | 403/297 |
| 7,618,210 B2 | | 11/2009 | Wagner et al. | |
| 8,333,531 B1 | | 12/2012 | Wei et al. | |
| 2007/0031187 A1 | | 2/2007 | McNeal et al. | |

* cited by examiner

INSERT CONNECTOR AND STEM CASTER ASSEMBLY USING THE SAME

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention is generally directed to the field of fasteners for use in connecting two or more elements together, and is more specifically directed to a connector for releaseably securing a first element having a hollow cavity to a second element such that a portion of the second element is fixed within the cavity of the first element. In a preferred embodiment, the invention is directed to a connector for removably securing a stem attachment, such as a caster, into the hollow end of a leg or other support.

2. Description of Related Art

A variety of different means are known for removably fixing two components or members of an object together. For example, it is known to connect a caster wheel to the bottom of a leg or other support, via a caster stem inserted into a socket positioned within a cavity in the bottom end of the support. The caster stem commonly includes a peripheral channel into which a mounting ring in the socket is received to lock the caster stem in place within the socket. While this method for connecting a caster wheel to a support is useful, it is often times difficult to push the stem into the locked position. In addition, it can be difficult to remove the caster stem from the socket if the caster wheel later breaks or the caster stem otherwise needs to be removed. The sockets are commonly made of molded plastic which can break or deform making it even more difficult to insert or remove the caster stem.

BRIEF SUMMARY OF THE INVENTION

The present invention is directed to a connector for removably securing a first member having a hollow cavity with a second member, such that a portion of the second member is removably fixed within the hollow cavity of the first member. The connector is configured to be inserted into the hollow cavity and has an outer bearing wall or surface that corresponds with a portion of an inner wall of the cavity, such that the outer bearing surface can rest in abutting engagement with the corresponding portion of the inner wall when the connector is inserted into the cavity of the first member. The connector also includes an inner bearing surface that corresponds with a portion of an outer wall or surface of a second member, such that the inner bearing surface can rest in abutting engagement with the corresponding portion of the second member's outer surface when a portion of the second member is positioned within the hollow cavity of the first member adjacent the inner bearing surface. The connector is additionally configured to accommodate the use of a force applicator to press the corresponding portion of the second member's outer surface against the inner bearing surface of the connector and to press the outer bearing surface of the connector against the corresponding portion of the first member's inner wall, such that the portion of the second member positioned within the cavity of the first member and the connector are removably fixed within the first member. In a preferred embodiment, the body includes a hinge that enables movement of at least a portion of the outer surface of the connector outward to press against the inner wall of the first member upon the application of force by the force applicator. In a most preferred embodiment, the outer bearing surface is configured to fully contact the inner wall of the first member when sufficient force is applied by the force applicator.

In one embodiment, the connector has top, bottom, rear and front sides extending from a first end to a second end. The outer peripheral side wall or surface is configured to be inserted into the hollow cavity of a first member such that at least a portion of the outer surface is positioned adjacent the inner wall of the cavity. The top and bottom sides of the connector are connected along the rear side. A gap or slot extends between the top and bottom sides along the front side of the connector. The rear side of the connector defines a hinge to enable movement of the top and bottom sides relative to one another to expand or increase the outer circumference of the connector, thereby increasing the size of the gap between the top and bottom sides. In a preferred embodiment, the bottom side includes an outer bearing surface corresponding with a portion of the first member's inner wall, and an opposing inner bearing surface corresponding to a portion of the second member's outer surface. A central opening extends between the inner bearing surface and an inner surface of the top side. An aperture extends through the top side to the opening opposite and generally perpendicular to the inner bearing surface. The aperture is configured to receive a force applicator, such as a set screw, for applying pressure against a portion of the second member positioned within the opening to sandwich the second member between the force applicator and the inner bearing surface.

In a most preferred embodiment. The connector is configured and particularly well adapted to secure a stemmed attachment such as a stem caster within the hollow end of a leg or other support. The connector has an outer peripheral surface extending from a front top edge around top, back and bottom sides of the connector to a bottom front edge. The outer peripheral surface of the connector is configured to correspond in shape with the hollow end of the leg or other support into which the stem of the stemmed attachment is to be fixed, such that at least a portion of the outer peripheral surface can be positioned in abutting engagement with the inner wall of the hollow support. The circumference of the outer peripheral surface is less than the circumference of the inner wall of the hollow end such that the connector can be easily inserted into the hollow end of the support. The top and bottom sides include opposed inner walls facing one another and spaced apart a distance to define a gap between the top and bottom sides. A semi-circular groove is formed in the inner surface of the bottom side adjacent the central opening that corresponds in shape with a portion of the outer surface of the stem, such that a portion of the stem can rest within the groove when inserted into the gap. A hinge slot extends rearward from the gap into a portion of the rear side of the connector. A threaded aperture extends through the top side of the body at an angle perpendicular to the longitudinal axis of the connector. The aperture is configured to receive a set screw to extend into the gap opposite the groove and apply force against the stem positioned with the gap, such that it presses into the groove. In use, the connector of this preferred embodiment is inserted into the hollow end of a leg or other support and the stem of a stemmed attachment is inserted into the gap between the top and bottom sides of the connector. The aperture in the top of the connector is aligned with a corresponding aperture in the side of the hollow support. A force applicator, such as a set screw, is inserted through the apertures and torque is applied so that the inserted end of the set screw applies force against the stem. The stem is thereby pressed within the groove in the inner surface of the bottom side to hold it in position. Continued torque or force applied to the set screw causes the hinge slot to widen, expanding the gap between the top and bottom sides and the overall circumference of the connector, such that the outer wall of the connector presses tightly against the inner wall of the support to hold it in place. Where the support is thin walled, such as an aluminum tube, the wall of the support is stretched to conform to the outside profile of the connector such that there is full surface area contact between the outer wall of the connector and inner wall of the support.

In a most preferred embodiment, the connector is extruded as a unitary piece of material having a uniform cross section. The connector is produced by extruding an elongated cylinder or bar having a uniform cross-sectional configuration. In particular, the extruded cylinder or bar has an outer peripheral wall, a central opening or gap between upper and lower inner walls, a groove in one of the inner walls and a hinge slot between the upper and lower inner walls. The extruded cylinders/bars are then cut to desired length to make the connectors and may be drilled and tapped to form a threaded aperture for a force applicator. In this embodiment, the connectors are made from an extrudable material such as aluminum or an alloy of aluminum.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
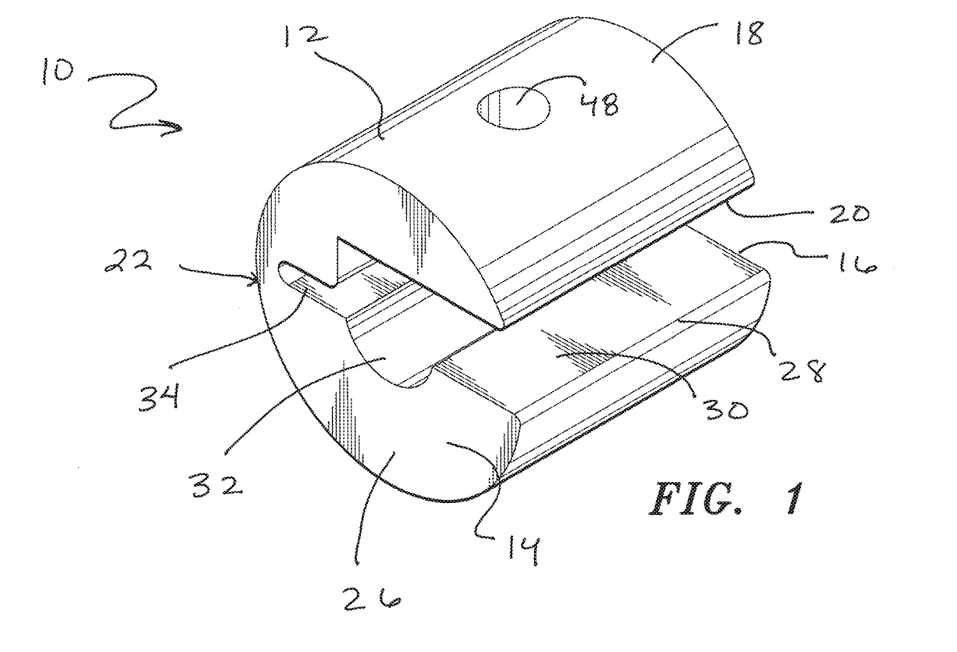
FIG. 1 is a perspective view of one embodiment of an insert connector in accordance with the present invention.
Figure 2:
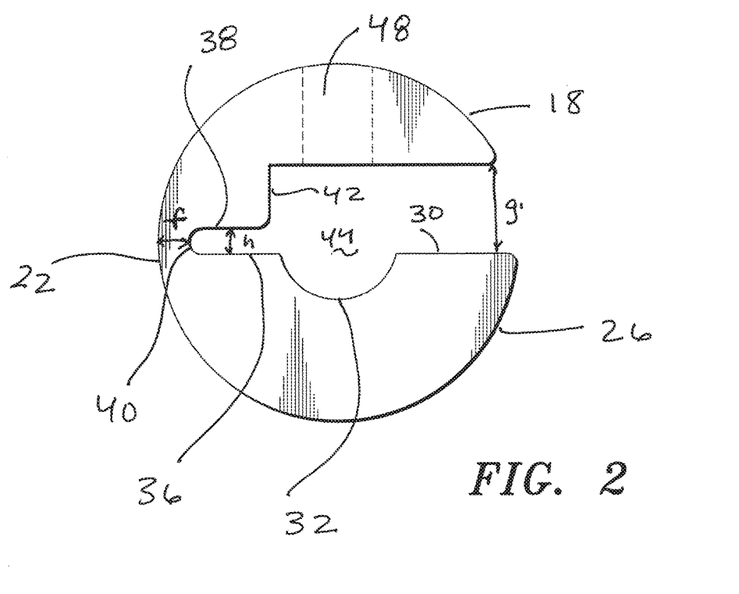
FIG. 2 is a side plan view of the insert connector of FIG. 1.
Figure 3:
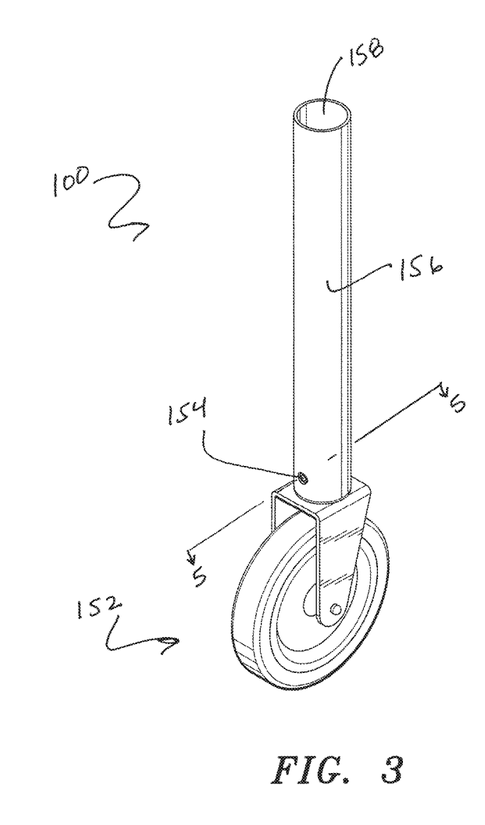
FIG. 3 is a perspective view of an assembly of a stem caster secured to a round tube utilizing the insert connector of FIG. 1.
Figure 4:
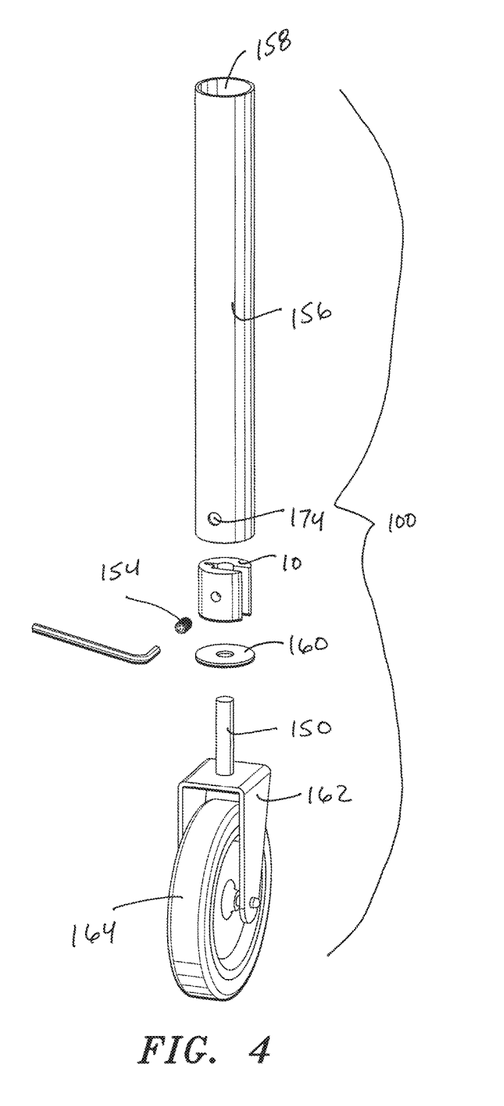
FIG. 4 is an exploded view of the assembly of FIG. 3.

Referring now to FIGS. 1 and 2, a connector in accordance with one embodiment of the present invention is designated generally by reference number 10. Connector 10 has a cylindrical peripheral outer surface 12 extending from first end 14 to second end 16. The cross-sectional configuration of connector 10 as best seen in FIG. 2 is uniform throughout the length of connector 10. A top side 18 of connector 10 extends from an upper front edge 20 to a rear side 22 of the connector. Top side 18 has a planar inner wall or surface 24 extending rearward from upper front edge 20 generally parallel the longitudinal axis of connector 10. A bottom side 26 of connector 10 extends from a lower front edge 28 to rear side 22. Bottom side 26 has an inner wall or surface 30 extending rearward from lower front edge 28 generally parallel top inner wall 24. A semi-circular groove 32 formed in bottom inner surface 30 along the central axis of connector 10 is configured to define an inner bearing surface against which the side of a stem or other cylindrical element may abuttingly engage. An open area or gap 44 extends between bottom inner surface 30 and top inner wall 24.

A hinge slot 34 is formed at a mid-point in rear side 22 between the top and bottom of connector 10. Hinge slot is defined by bottom hinge wall 36 extending rearward from groove 32 and top hinge wall 38 connected via rear concave flex wall 40. Flex wall 40 is positioned a distance f from the outer wall of rear side 22. Hinge walls 36, 38 are spaced apart a distance h and extend parallel the longitudinal axis of connector 10. Vertical wall 42 extends upwardly from the front edge of top hinge wall 38 to the rear end of top inner wall 24 perpendicular the longitudinal axis of connector 10. Bottom inner surface 30 is generally aligned with bottom hinge wall 36 extending below and adjacent the mid-point between the top and bottom of the connector. The size or length $g_1$ of gap 44 as measured from top front edge 20 to bottom inner surface 30 along an axis perpendicular to surface 30 is equivalent to the sum of the distance h between hinge walls 36, 38 and the length of vertical wall 42.

A threaded aperture 48 extends through top side 18 into gap 44 opposite groove 32 in a direction perpendicular the longitudinal axis of connector 10. Threaded aperture 48 is configured such that a set screw or other force applicator may be rotatably extended through the aperture into gap 44.

Connector 10 may be used to removably connect two or more components together. Specifically, connector 10 may be inserted into a hollow cavity of a first component with outer wall 12 abutting the inner wall of the cavity. The first component includes a hole or opening through the wall of the cavity that can be aligned with threaded aperture 48 of connector such that a set screw or other force applicator can be inserted through the wall of the first component into threaded aperture 48. A stem or other cylindrical element of a second component is then inserted into gap 44 along the central axis of connector 10 such that outer side of the stem can rest within groove 32 in abutting engagement with the bearing surface formed by groove 32. The set screw may then be tightened such that the end of the screw moves into contact with the inner side of the stem, pressing a portion of the stem surface against the inner bearing surface of bottom side 26 formed by groove 32. The pressure applied against the inner bearing surface of bottom side 26 also forces top and bottom sides 18, 26 apart, pivoting about flex wall 40, thereby widening gap 44 between the sides from a length $g_1$ (shown in FIG. 2) to a length $g_2$ (shown in FIG. 6) and causing outer wall 12 to expand (increase in circumference) and press against the inner wall of the first component.

In this manner, the stem is removably fixed in place between the set screw and the inner bearing surface or groove 32 of connector 10 and the connector 10 is fixed in place against the inner wall of the first component. To disconnect the components, the set screw is untightened out of contact with the stem, the top and bottom sides 18, 26 each return to their original position decreasing the gap to length $g_1$ due to the flexible nature of connector 10. The circumference of the connector is reduced such that the outer wall of the connector is not pressed hard against the inner wall of the cavity and the stem is no longer sandwiched between the inner wall of the connector and the end of the set screw.

Figure 5:
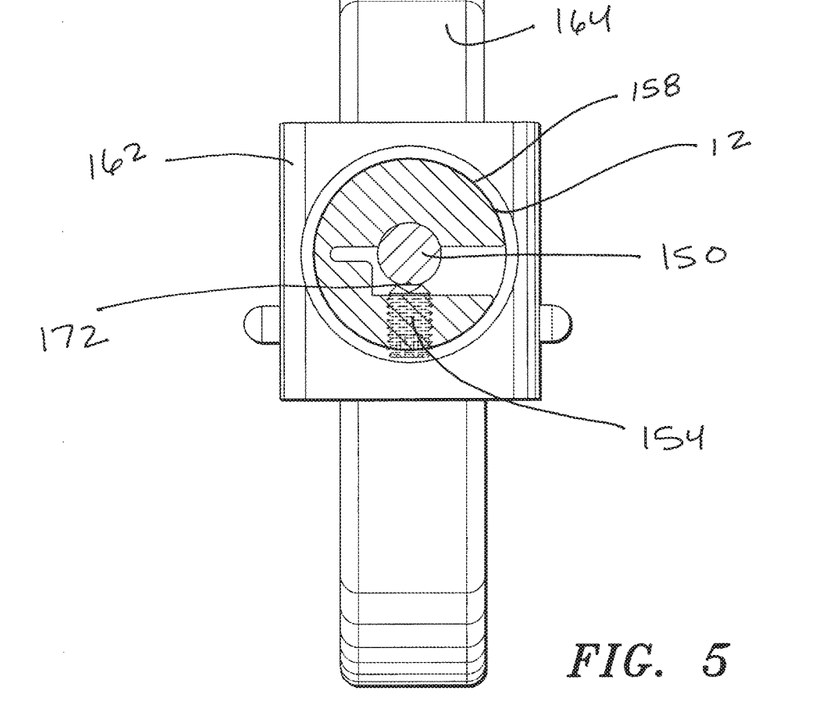
FIG. 5 is a cross-sectional view of the assembly of FIG. 3 taken along line 5-5.
Figure 6:
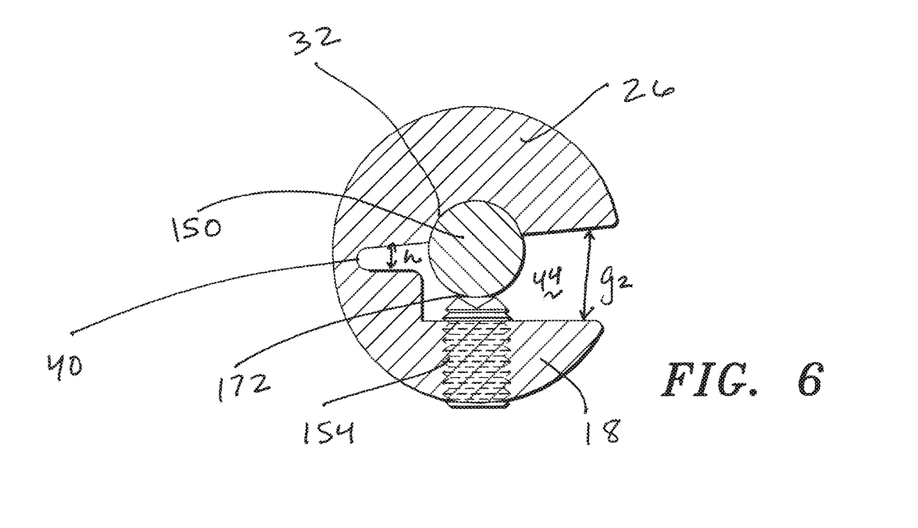
FIG. 6 is a cross-sectional view of the insert connector with in the assembly of FIG. 3 taken along line 5-5 via force applied by the screw showing expansion of the insert connector.

Looking to FIGS. 3-6, assembly 100 includes connector 10, tube 156, set screw 154, washer 160, and stem caster 152. Tube 156 has an inner surface 158 and an opening 174 configured to receive set screw 154 through the lower end of the tube. Set screw 154 has a first end and a second end 172 (FIGS. 5-6). Stem caster 152 includes stem 150 extending upwardly from a top plate of fork 162 in which wheel 164 is mounted. Stem 150 has a radius corresponding with groove 32 of insert connector 10.

The bottom edge of tube 156 rests on the top plate of fork 162. Connector 10 is inserted into the bottom of tube 156 with one end resting on washer 160 which is also supported on the top plate of fork 162. Stem 150 is inserted into gap 44 with the outer side of stem 150 resting in groove 32 (FIG. 5). Opening 174 and threaded aperture 148 are each aligned such that set screw 154 extends through each opening and can be tightened to press against the inner side of stem 150. The first end of set screw 154 is exposed so that the position of set screw 154 may be adjusted with a torque-applying implement such as a hex key, Allen wrench or a Phillips-head or flat-head screwdriver.

As shown in FIGS. 5 and 6, pressure is exerted by second end 172 of set screw 154 against the inner side of stem 150, which in turn causes the outer side of stem 150 to exert pressure against the inner bearing surface formed by groove 32 in bottom side 26. As a result, top and bottom sides 18, 26 are rotated away from one another about flex wall 40 such that gap 44 is increased from $g_1$ to $g_2$ (shown in FIGS. 1 and 6 respectively).

The increase in the size of gap 44 causes outer surface 12 of connector 10 to press outwardly against inner surface 158 of tube 156. The force of outer surface 12 pressing against inner surface 158 in combination with the resulting increased friction between outer surface 12 and inner surface 158 cause connector 10 to be firmly secured to tube 156. The force of set screw 154 pressing stem 150 within groove 32 in combination with the resulting increased friction between both set screw 154 and stem 150 and between stem 150 and bottom side 26 cause connector 10 to be firmly secured to stem caster 152. In a preferred embodiment where the relatively thin tube wall is made from aluminum or other material having some resilience, the tube wall is stretched by expansion of connector 10 outward such that the lower portion of tube 156 surrounding connector 10 conforms to the outside profile of the connector, with full surface area contact between the outer wall of connector 10 and inner wall of the tube. As a result, stem caster 152 is firmly coupled to tube 156.

The above steps may be reversed to separate assembly 100 into its individual components. Loosening set screw 154 until the second end 172 of set screw 154 comes out of contact with stem 150 relieves the pressure exerted against the bottom side 26. This allows top and bottom sides 18, 26 to rotate back towards one another about flex wall 40 until the gap 44 returns to $g_1$. This relieves the pressure exerted by outer surface 12 against inner surface 158 of the tube and lowers the friction between outer surface 12 and inner surface 158. The set screw 154 may then be removed from opening 174 and threaded aperture 48 such that tube 156 can be separated from connector 10 and the stem 150 can be removed and separated from tube 156.

Figure 7:
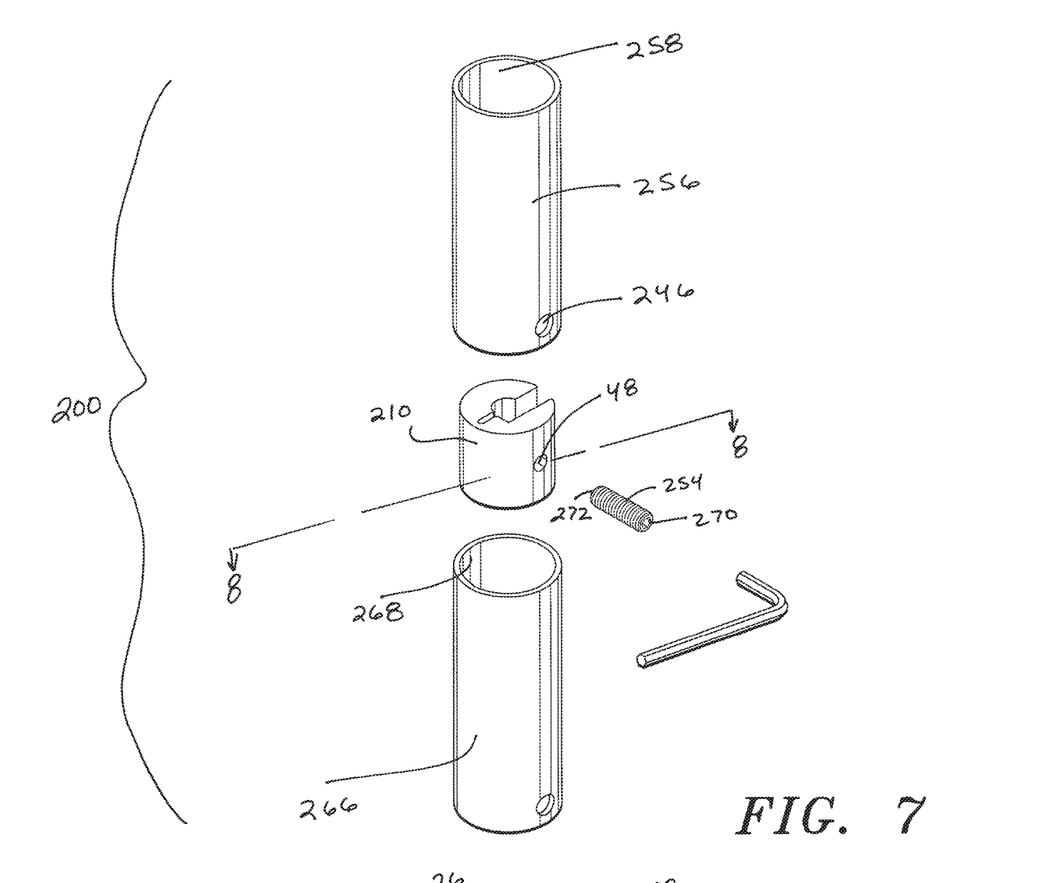
FIG. 7 is an exploded view of an assembly of two round tubes secured together by the connector of FIG. 1.
Figure 8:
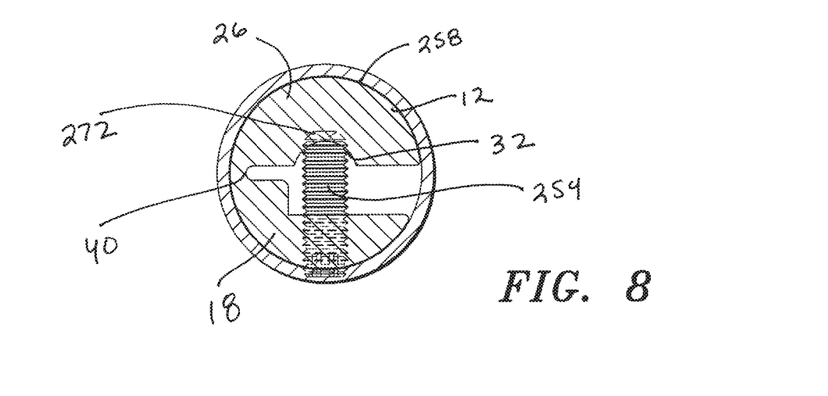
FIG. 8 is a cross-sectional view of the assembly of FIG. 7 taken along line 8-8.

Connector 10 can also be used to connect two hollow members together. FIGS. 7 and 8 depict an assembly generally designated by numeral 200 of two hollow tubes coupled together using connector 10 in accordance with the present invention. Assembly 200 includes connector 10, first tube 256, second tube 266, and set screw 254. First tube 256 and second tube 266 are identical hollow cylindrical tubes that include respective inner surfaces 258, 268. The inner diameter of first and second tubes 256, 266 is only slightly larger than the diameter of connector 10 such that the connector can be easily inserted into the ends of first and second hollow tubes 256, 266.

One end of connector 210 is positioned within the bottom of first tube 256 and the other end of connector 10 is positioned within the top of second tube 266, such that the bottom edge of first tube 256 is positioned in abutting engagement with the top edge of second tube 266. Opening 246 formed in first tube 256 and threaded aperture 48 in connector 10 are each aligned such that set screw 254 extends into aperture 48. As best shown in FIG. 8, when set screw 254 is tightened, second end 272 of the screw presses against the bearing surface formed by groove 32 so as to press against bottom side 26. As pressure is exerted by the second end 272 of set screw 254, the pressure causes top side 18 and bottom side 26 to be rotated away from one another about flex wall 40 such that the gap 44 between the sides is increased causing outer surface 12 of insert connector 10 to expand and press outwardly against inner surfaces 258, 268 of respective first and second tubes 256, 266. The force of outer surface 12 pressing against inner surfaces 258, 268 in combination with the resulting increased friction between the outer surface 12 and respective inner surfaces 258, 268 cause insert connector 10 to be firmly secured to first and second tubes 256, 266 such that the tubes are in turn removably fixed to one another.

The above steps may be performed in the reverse to separate assembly 200. Loosening set screw 254 until second end 272 comes out of contact with the bearing surface formed by groove 32 allows top and bottom sides 18, 26 to rotate back towards one another about flex wall 240 until the gap 44 returns to $g_1$ (as shown in FIG. 1). This relieves the pressure exerted by outer surface 12 against inner surfaces 258, 268 and lowers the friction between outer surface 12 and inner surfaces 258, 268 so that first and second tubes 256, 266 may be separated.

Figure 9:
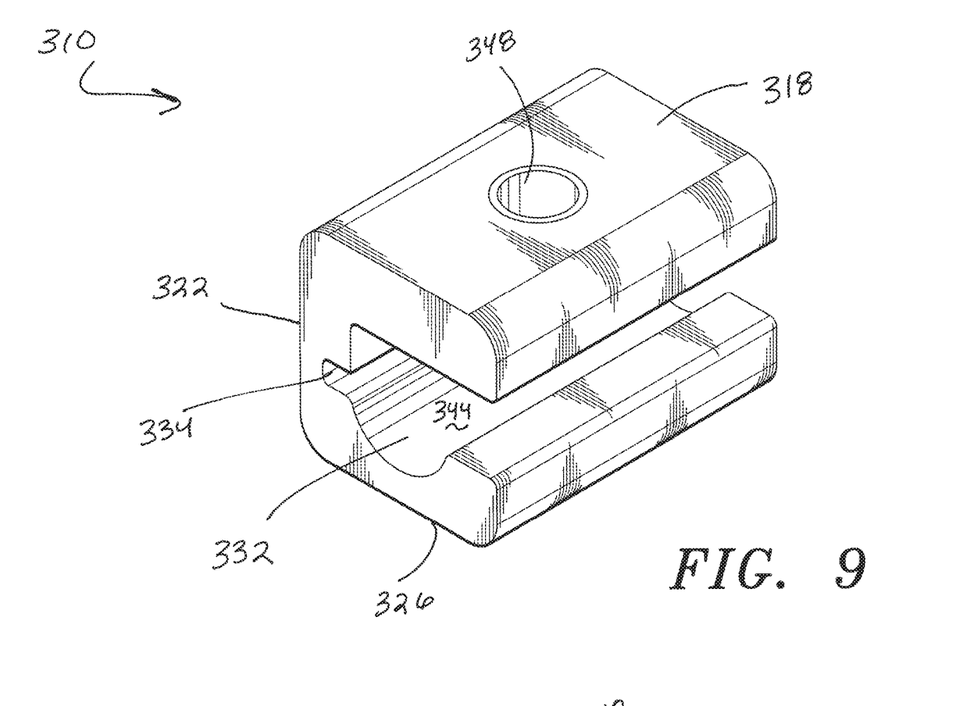
FIG. 9 is a perspective view of a second embodiment of an insert connector in accordance with the present invention.
Figure 10:
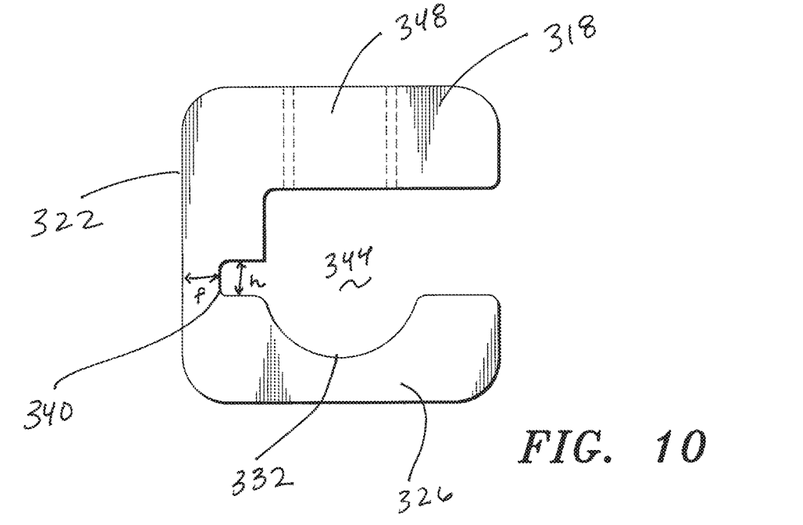
FIG. 10 is a side plan view of the insert connector of FIG. 9.

Although connector 10 as shown in FIGS. 1-8 is cylindrical, alternatively shaped connectors are within the scope of the present invention as long as the connector is configured to be inserted into a hollow cavity of a member and at least a portion of the outside surface of the connector corresponds with the inner surface of the cavity so that sufficient pressure can be applied by the outside surface of the connector to the inner surface of the cavity to hold the connector in place. An alternative, non-limiting embodiment of a connector in accordance with the present invention is shown in FIGS. 9-10 and is generally designated by the numeral 310. Connector 310 has a square cross-sectional configuration with rounded corners, but otherwise has functional features and components similar to connector 10, including top side 318, rear side 322, bottom side 326, groove 332, gap 344, hinge slot 334 and threaded aperture 348.

Figures 11, 12:
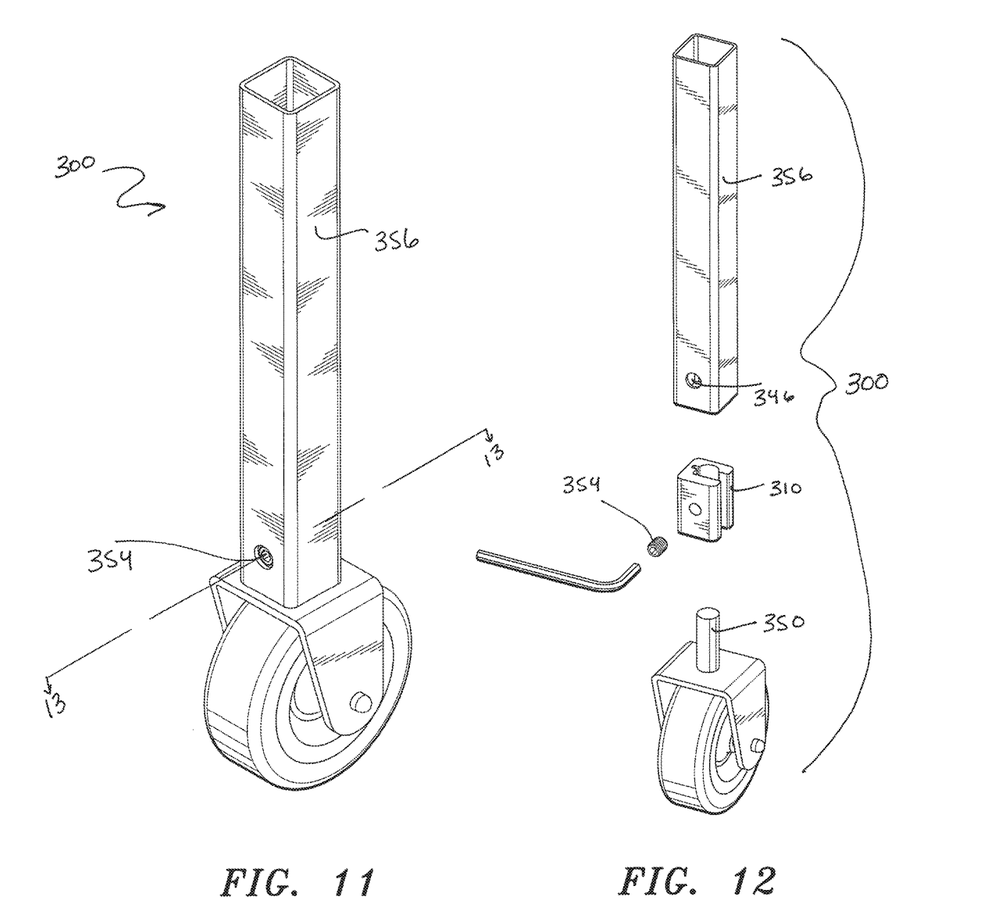
FIG. 11 is a perspective view of an assembly of a stem caster secured to a square tube utilizing the insert connector of FIG. 9.
FIG. 12 is an exploded view of the assembly of FIG. 11.
Figure 13:
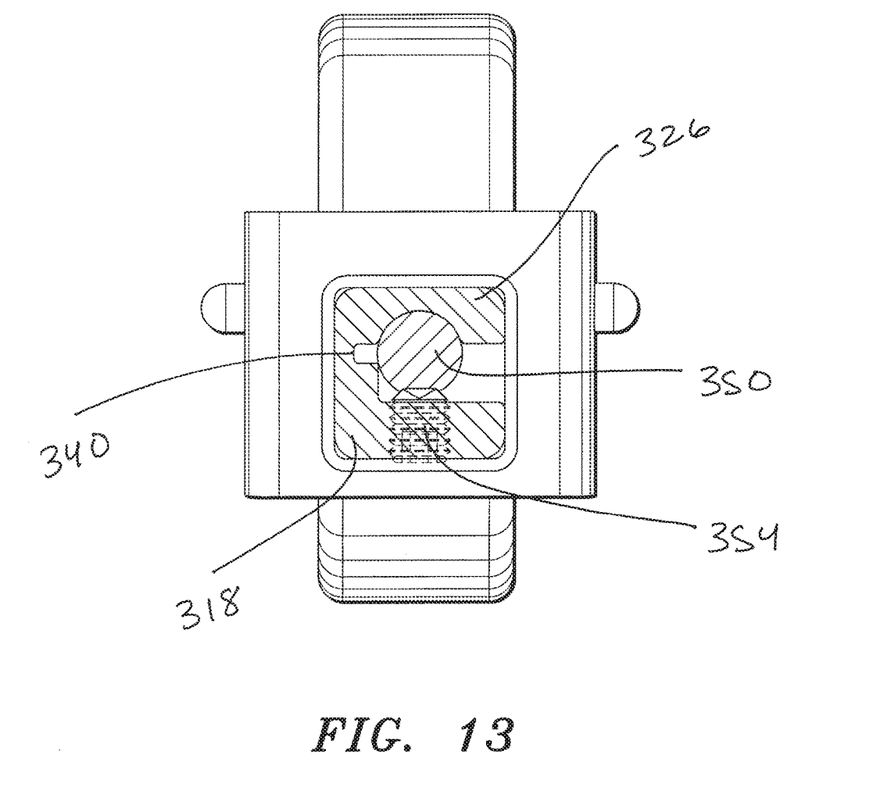
FIG. 13 is a cross-sectional view of the assembly of FIG. 11 taken along line 13-13.

With reference to FIGS. 11-13, an assembly 300 is shown including square connector 310, square tube 356, set screw 354, stem caster 352 and stem 350. Assembly 300 differs from assembly 100 in only three respects: tube 356 is cubical or square with rounded corners rather than cylindrical; the outer configuration of insert connector 310 is cubical or square with rounded corners rather than cylindrical; and the assembly does not include a washer.

Looking to FIGS. 2 and 10, the size or length of the gap $g_1$ between the top and bottom inner surfaces will vary depending upon the overall size of the connector, the properties of the material used to make the connector, and the amount of flex or expansion desired. In general, $g_1$ will preferably range from 20 to 30% of the outer diameter of connector 10. The distance h between hinge walls 36, 38 may similarly vary but will preferably range from 5 to 20% the diameter of insert connector 10. The distance f between outer wall 12 and hinge flex wall 40 may also vary but will preferably range from 1.5 to 3% the diameter of insert connector 10. Although hinge walls 36, 38 are spaced apart a shorter distance than the length of gap 44, it is within the scope of the present invention that hinge walls 36, 38 may be spaced apart a larger distance up to the size of gap 44. In such a configuration, the length of vertical wall 42 may be reduced and the distance f between the outer wall and the hinge flex wall 40 may be increased.

With reference to FIG. 2, in a preferred embodiment particularly well adapted for coupling a stem attachment such as a stem castor within a round hollow end of a leg, tube or support, the outer circumference of component 10 (when not expanded) is about 4.144 inches where the circumference of the inner wall of the hollow end of the support is about 4.188 inches, the outer diameter of component 10 is about 1.320 inches, gap $g_1$ (when not expanded is about 0.312 inches and gap $g_2$ (when expanded as shown in FIG. 6) is about 0.345 inches, distance h between hinge walls 36, 38 is about 0.110 inches and distance f between outer wall 12 and hinge flex wall 40 is about 0.100 inches.

With reference to FIG. 10, in a second preferred embodiment particularly well adapted for coupling a stem attachment such as a stem castor within a square hollow end of a leg or support, the outer diameter of component 10 (when not expanded) is about 0.875 inches where the diameter of the inner wall of the hollow end of the support is about 0.900 inches, gap $g_1$ (when not expanded is about 0.200 inches and gap $g_2$ (when expanded as shown in FIG. 6) is about 0.200 inches distance h between hinge walls 36, 38 is about 0.110 inches and distance f between outer wall 12 and hinge flex wall 40 is about 0.080 inches.

Connectors 10, 310 are rigid, yet sufficiently flexible such that hinge walls 36, 38, 336, 338 and top and bottom sides 18, 26, 318, 326 are rotatably moveable about flex wall 40, 340 when sufficient force is applied via a set screw or other force applicator without causing the connector to permanently deform. Connectors 10, 310 are each preferably made of singular construction, are preferably formed from either a extrudable, malleable or moldable material and are most preferably extruded. Suitable materials include metals, preferably aluminum, aluminum alloys, or stainless steel, plastics, composites and ceramics.

In a most preferred embodiment, connectors 10, 310 are produced by extruding an elongated cylinder or bar having the cross-sectional configuration of connectors 10, 310 respectively as shown in FIGS. 2 and 10. In particular, the die used to form the extrusion is configured to form a cylinder or bar with an outer peripheral wall 12, 312, a gap 44, 344, a groove 32, 332 and a hinge slot 43, 334. The extruded cylinders/bars are then cut to desired length and each cut piece is then drilled and tapped to form a threaded aperture 48, 348. The connectors 10, 310 are extruded using conventional extrusion equipment and processes as is well known in the art. In this embodiment, the connectors are made from an extrudable material such as aluminum or an alloy of aluminum. Suitable materials for extruding the connector include the 6000 series of aluminum alloys such as 6063-T5 and 6061-T6.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. For example, while the outer configuration of the connector has been shown as either round or squared, other configurations are considered to be within the scope of the invention. In addition, while the connector 10, 310 shown has a continuous peripheral outer wall 12, 312 extending from a top front edge to a bottom front edge, it is anticipated that the outer wall may not be continuous and may only contact the inner wall of the first member at one or more locations. Similarly, while groove 32, 332 is semi-circular in configuration to conform with the shape of cylindrical stem, it is nonetheless within the scope of the present invention for the groove to have alternative shapes in order to accommodate a stem or other member of another shape. As a non-limiting example, the groove may be squared in order that it will sheath a portion of a cubical stem of a stemmed attachment.

Further, it will be understood that certain features and subcombinations are of utility and may be employed without reference to other features and subcombinations. This is contemplated by and is within the scope of the claims.

What is claimed and desired to be secured by Letters Patent is as follows:

1. A stemmed attachment and support assembly comprising;
   a. a support having a hollow cavity with an opening at one end of said support and a first aperture extending through a portion of said support adjacent the hollow cavity;
   b. a stemmed attachment having a stem extending from an attachment body;
   c. a connector comprising:
      i. an elongated connector body having an outer peripheral surface extending from a front top edge around top, back and bottom sides of the connector to a bottom front edge, wherein the outer peripheral surface corresponds in shape with the hollow cavity of the support;
ii. wherein the top side defines a top inner wall and the bottom side defines a bottom inner wall, and wherein said top and bottom inner walls extend generally parallel to a longitudinal axis of the connector and are spaced apart a distance to define a gap between the top and bottom sides;
iii. a groove formed in the bottom inner wall that corresponds in shape with at least a portion of an outer surface of the stem and is configured to receive at least a portion of the stem;
iv. a hinge slot extends rearward from the gap into a portion of the back side of the connector;
v. a second aperture extending through the top side at an angle perpendicular to the longitudinal axis of the connector and configured to receive a force applicator;
d. said connector is inserted into said cavity and said stem is positioned within said gap such that the stem extends into the cavity through said opening at one end of the support with the attachment body positioned outside the hollow cavity adjacent the one end of the support, and wherein said stem extends into the cavity parallel to the longitudinal axis of the connector and the gap; and
e. a force applicator extends through said first and second apertures pressing said stem within the groove and a portion of the outer surface of the connector against the inner wall of the support to fix said connector and said stem within said cavity.

2. The assembly of claim 1, wherein said connector comprises an extruded body.

3. The assembly of claim 2, wherein said connector is made from aluminum or aluminum alloy.

4. The assembly of claim 1, wherein said support is a hollow tube.

5. The assembly of claim 1, wherein the entire outer surface of the connector is in contact with an inner wall of the support extending in the cavity.

6. The assembly of claim 5, wherein the support is stretched around said connector.

7. The assembly of claim 1, wherein the stemmed attachment is a caster.

8. The assembly of claim 1, wherein said groove extends a length of the connector.

9. The assembly of claim 1, wherein said stem is cylindrical.

10. The assembly of claim 1, wherein said force applicator is a set screw.

11. The assembly of claim 1, wherein said force applicator extends through said first and second apertures substantially perpendicular to a longitudinal axis of the elongated connector body.

* * * * *